(12) United States Patent  
Agarwal (10) Patent No.: US 7,703,039 B2  
(45) Date of Patent: Apr. 20, 2010

(54) METHODS AND APPARATUS FOR DISPLAYING INFORMATION

(75) Inventor: Amit Agarwal, Noida (IN)

(73) Assignee: Adobe Systems Incorporated, San Jose, CA (US)

( * ) Notice: Subject to any disclaimer, the term of this patent is extended or adjusted under 35 U.S.C. 154(b) by 722 days.

(21) Appl. No.: 11/366,152

(22) Filed: Mar. 2, 2006

(65) Prior Publication Data

US 2007/0136677 A1   Jun. 14, 2007

(51) Int. Cl.  
*G06F 3/048* (2006.01)

(52) U.S. Cl. ................ 715/788; 715/781; 715/790; 715/794; 715/802; 715/804; 715/767; 715/778; 715/805

(58) Field of Classification Search ............. 715/767, 715/778, 781, 802, 804, 805, 790, 794  
See application file for complete search history.

(56) References Cited

U.S. PATENT DOCUMENTS

| | | | | |
|---|---|---|---|---|
| 4,896,290 A | * | 1/1990 | Rhodes et al. | 710/67 |
| 4,975,690 A | * | 12/1990 | Torres | 715/856 |
| 5,590,264 A | * | 12/1996 | Keane et al. | 715/838 |
| 5,596,714 A | * | 1/1997 | Connell | 714/38 |
| 5,742,778 A | * | 4/1998 | Hao et al. | 715/759 |
| 5,995,103 A | * | 11/1999 | Ashe | 715/804 |
| 5,999,176 A | * | 12/1999 | Kamper | 715/787 |
| 6,215,490 B1 | * | 4/2001 | Kaply | 715/788 |
| 6,229,544 B1 | * | 5/2001 | Cragun | 345/418 |
| 6,615,299 B1 | * | 9/2003 | Chu et al. | 710/65 |
| 6,633,313 B1 | * | 10/2003 | Cirne et al. | 715/744 |
| 6,976,216 B1 | * | 12/2005 | Peskin et al. | 715/716 |
| 7,114,129 B2 | * | 9/2006 | Awada et al. | 715/786 |
| 7,260,773 B2 | * | 8/2007 | Zernik | 715/229 |
| 2003/0184592 A1 | * | 10/2003 | Awada et al. | 345/788 |
| 2004/0001098 A1 | * | 1/2004 | Numano | 345/773 |
| 2004/0216135 A1 | * | 10/2004 | Heimbeck | 719/318 |
| 2005/0055647 A1 | * | 3/2005 | Chen | 715/827 |
| 2006/0174214 A1 | * | 8/2006 | McKee et al. | 715/802 |

OTHER PUBLICATIONS

Frank Adelstein, Xlax—X Window System Program to Send Keyboard Input to Multiple Windows, 1997, Hans-Peter Bischof, Unroff & Hp-tools, http://www.cs.rit.edu/~hpb/Man/_Man_X_html/htmln/xlax.n.html.*

* cited by examiner

*Primary Examiner*—Kieu Vu  
*Assistant Examiner*—Patrick F Riegler  
(74) *Attorney, Agent, or Firm*—Chapin IP Law, LLC; Barry W. Chapin, Esq.

(57) ABSTRACT

A computer system receives a command to initiate setting a display mode of its corresponding display screen to one in which received input commands (e.g., mouse input, keyboard input, etc.) are directed to multiple display applications running on the computer system instead of only a single display application in a foreground (e.g., a "topmost" window presented to a user) on the computer display screen. For example, based on input from a user, an auxiliary application herein receives an identification of at least a first display application and a second display application that each display information on different respective windows of the display screen. Thereafter, the auxiliary application duplicates received input commands and forwards the received input commands to both the first display application and the second display application, alleviating the user from having to separately apply the same commands to each of the first and second display applications.

30 Claims, 5 Drawing Sheets

METHODS AND APPARATUS FOR DISPLAYING INFORMATION

CROSS REFERENCE TO RELATED APPLICATIONS

This Patent Application claims priority to Indian Patent Application No. 3303/DEL/2005 filed on Dec. 8, 2005, entitled, "METHODS AND APPARATUS FOR DISPLAYING INFORMATION", the contents and teachings of which are hereby incorporated by reference in their entirety.

BACKGROUND

Computer systems are capable of storing vast amounts of data and information. To store such information, a typical computer system maintains a logical data structure called a file system that serves as an index of individually accessible data repositories commonly known as files. A typical file system may provide a hierarchical arrangement of directories, sometimes referred to as folders. Each directory or folder maintains the identity of individual files stored within that directory or folder.

Contents of certain types of files stored in a file system can be displayed via a display application running in a respective computer system. For example, based on selection of a display application by a user, a respective computer system can initiate execution of the display application. When up and running, the display application enables a user to retrieve a file for viewing respective contents of the file on a display screen. After opening a file in a display application, the user typically applies display commands (e.g., scrolling, editing, zooming, etc.) to the display application to modify how the file appears in a window on a respective display screen.

In certain cases, a file can be read and displayed by more than one type of display application. As an example, a text file typically can be viewed in Word™ as well as Word Perfect™. Consequently, a user can operate a respective computer system to view the same file in two different types of display applications at the same time by simultaneously displaying the file via multiple running display applications. Different display applications sometimes present contents of the same file in a different way for viewing by the user.

One purpose of displaying the same file in two different display applications is to compare how two side-by-side windows associated with respective display applications display the same file. During such a display process, when a file being displayed is relatively large and a respective display application cannot display contents of an entire file all at once, the user must manually provide input to each of two or more different display applications and toggle between these each time to synchronously scroll through the file for comparison purposes. For example, a user must manually jump back and forth between two windows and input the same set of display commands to both display applications to synchronously scroll in the side-by-side windows.

SUMMARY

Conventional display applications suffer from a number of deficiencies. For example, conventional techniques of displaying windows on a display screen do not enable a user to easily apply display commands to multiple display applications at the same time. Instead, a user is only able to apply a display command to a single window in the "foreground" (e.g., an "active" or "topmost" window usually highlighted with special visual effects) of a display screen. Consequently, as discussed, to control two separate display applications through an operating system, a user must manually duplicate the same input commands (e.g., clicking a scroll function on a mouse, pressing keys on a keyboard, etc.) and successively apply the manually generated input commands to two different window display applications. That is, the user has to jump back and forth from window to window to apply the display commands.

During this process of manually duplicating and applying the input commands to each of multiple windows, the user can easily make a mistake such that the same commands are not issued to both windows. For example, a user may scroll down a line in one window application and may accidentally scroll up one line in another window. Consequently, contents displayed in the respective windows can become asynchronous with respect to each other. This defeats one purpose of manually applying the same commands to the different window applications—which is to scroll contents of the windows simultaneously so that the user can compare the contents of one window to that of another window. In addition to being prone to operator error, manually generating duplicate display commands and jumping from window to window for synchronization purposes is quite tedious and time-consuming.

Techniques discussed herein deviate with respect to conventional display applications such as those discussed above as well as additional techniques also known in the prior art. In particular, embodiments herein include mechanisms and techniques to initiate execution of a software application having the ability to receive a single command from a user and forward the command or translated command to multiple window applications. Accordingly, a user can simultaneously control multiple display applications by applying a single set of input commands to two or more respective windows at the same time, even though all such windows do not simultaneously appear at a topmost level of the display screen. As discussed above, conventional techniques allow applying display commands to only a single topmost window of the display screen. Techniques herein enable forwarding of commands to "background" display applications such as windows that do not appear at the topmost layer of a display screen.

More specifically, as an example of one configuration herein, a user initiates execution of a first display application to display a first viewing region (e.g., a first window including display content) on a display screen. A user also initiates execution of a second display application to display a second viewing region (e.g., a second window including display content) on the display screen. The second display application operates independently of the first display application. For example, each respective display application can independently retrieve the same file for uniquely displaying the same file in respective first and second viewing regions.

In addition to initiating the first display application and the second display application, a user initiates execution of an auxiliary application that handles reception of input commands from the user. For example, the auxiliary application receives input commands from the user, duplicates the input commands, and forwards the input command to both the first display application and the second display application to simultaneously modify an appearance of the first viewing region and the second viewing region on the display screen. Consequently, the auxiliary display application enables a user to simultaneously control (e.g., scroll through) contents of the first viewing region and the second viewing region via a single control command (or a set of control commands) rather than requiring manual duplication of control commands by the user. In other words, the auxiliary display application serves to duplicate or translate input commands (e.g., a mouse or keyboard input) from the user for forwarding to multiple display applications. Consequently, a user can initiate display of a common document in both the first viewing region and the second viewing region for simultaneous scrolling, viewing, and comparison.

Note that scrolling is merely an example of a type of display command that can be duplicated and forwarded by the auxiliary display application. In general, any type of command can be duplicated and forwarded by the auxiliary display application. For example, an input command or display command can initiate i) a zooming function, ii) a document editing function, iii) a display function, iv) a pull-down menu function, etc. associated with the first viewing region and the second viewing region, and v) the auxiliary display application to tile the selected windows equally on the screen.

The user typically initiates execution of the auxiliary display application after initiating execution of the first and second display applications. The auxiliary display application can at least initially operate independently of the first display application and the second display application. For example, initially the auxiliary display application is not configured to duplicate and forward commands to any display applications. After initiating execution of the auxiliary display application, the user can select to which display applications to forward input commands generated by the user. In the present example, the user selects both the first display application and the second display application to forward commands.

One method of selecting which of multiple display applications to forward commands is to select (e.g., click on) a window on a display screen to which the input commands will be forwarded to by the auxiliary display application. For example, configuring the auxiliary display application can include i) receiving a first identifier associated with the first viewing region based on a first viewing region selection by the user and ii) receiving a second identifier associated with the second viewing region based on a second viewing region selection by the user.

According to another configuration herein, the auxiliary display application can have (although not necessary) an associated viewing region (e.g., a third viewing region) on the display screen in which to receive input commands. For example, the viewing region can include directional scroll icons for selection by the user to scroll about a display (e.g., images) associated with the first and second display applications at the same time. Displaying directional control icons in the third viewing region enables the user to simultaneously control a display presented in the first viewing region and the second viewing region based on further user display commands input to the third viewing region. As discussed, the auxiliary display application need not be associated with any viewing region on the display screen until after receiving the first viewing region selection and the second viewing region selection by the user.

According to yet other configurations herein, a user can select a mode in which the auxiliary display application receives input commands from a user and sends the input commands to any or all open windows on a display screen for simultaneously modifying an appearance of a respective display in the open windows on the display screen. Note in other configurations, a window need not be open on the display screen in order to receive an input command from the auxiliary display application. For example, the auxiliary display application can also send a duplicated input command to display applications having respective minimized windows on the display screen.

Other embodiments include a computerized device, workstation, handheld or laptop computer, or the like configured with software and/or circuitry (e.g., a processor) to process any or all of the method operations disclosed herein. In other words, a computerized device or a processor that is programmed or configured to operate as explained herein is considered an embodiment of the invention.

Yet other embodiments herein include software programs to perform the steps and operations summarized above and disclosed in detail below. One such embodiment comprises a computer program product that has a computer-readable medium including computer program logic encoded thereon that, when performed in a computerized device having memory, a processor, and a display device, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein.

It is to be understood that the system of the invention can be embodied strictly as a software program, as software and hardware, or as hardware alone such as within a processor, or within an operating system or a within a software application. Example embodiments of the invention may be implemented within products and/or software applications manufactured by Adobe Systems, Inc. of San Jose, Calif., USA.

As discussed above, techniques of the present application are well suited for use in computer systems that support display applications or general computer applications. However, it should be noted that embodiments of the present application are not limited to use in such applications and that the techniques discussed herein are well suited for other applications as well. Additional features of the present application will be further discussed via the Detailed Description section of this application as well as accompanying figures.

BRIEF DESCRIPTION OF THE DRAWINGS

The foregoing and other objects, features, and advantages of the present application will be apparent from the following more particular description of preferred embodiments of the present application, as illustrated in the accompanying drawings in which like reference characters refer to the same parts throughout the different views. The drawings are not necessarily to scale, with emphasis instead being placed upon illustrating the embodiments, principles and concepts.

DETAILED DESCRIPTION

According to one implementation herein, a computer system receives a command to initiate setting a display mode of its corresponding display screen to one in which received input commands (e.g., mouse input, keyboard input, etc.) are directed to multiple display applications (e.g., independently executing processes that utilize interprocess communications to display images in respective windows on a display screen) running on the computer system instead of only a single display application in a foreground (e.g., a "topmost" window presented to a user) on the computer display screen. For example, based on input from a user, an auxiliary application herein receives an identification of at least a first display application and a second display application that each display information in different respective windows. Thereafter, the auxiliary application duplicates received input commands and forwards the received input commands to both the first display application and the second display application. In this way, a user can configure the auxiliary application to automatically duplicate and forward input commands to multiple selected display applications in lieu of the user having to jump between multiple windows and manually apply the same set of display commands to multiple windows.

Figure 1:
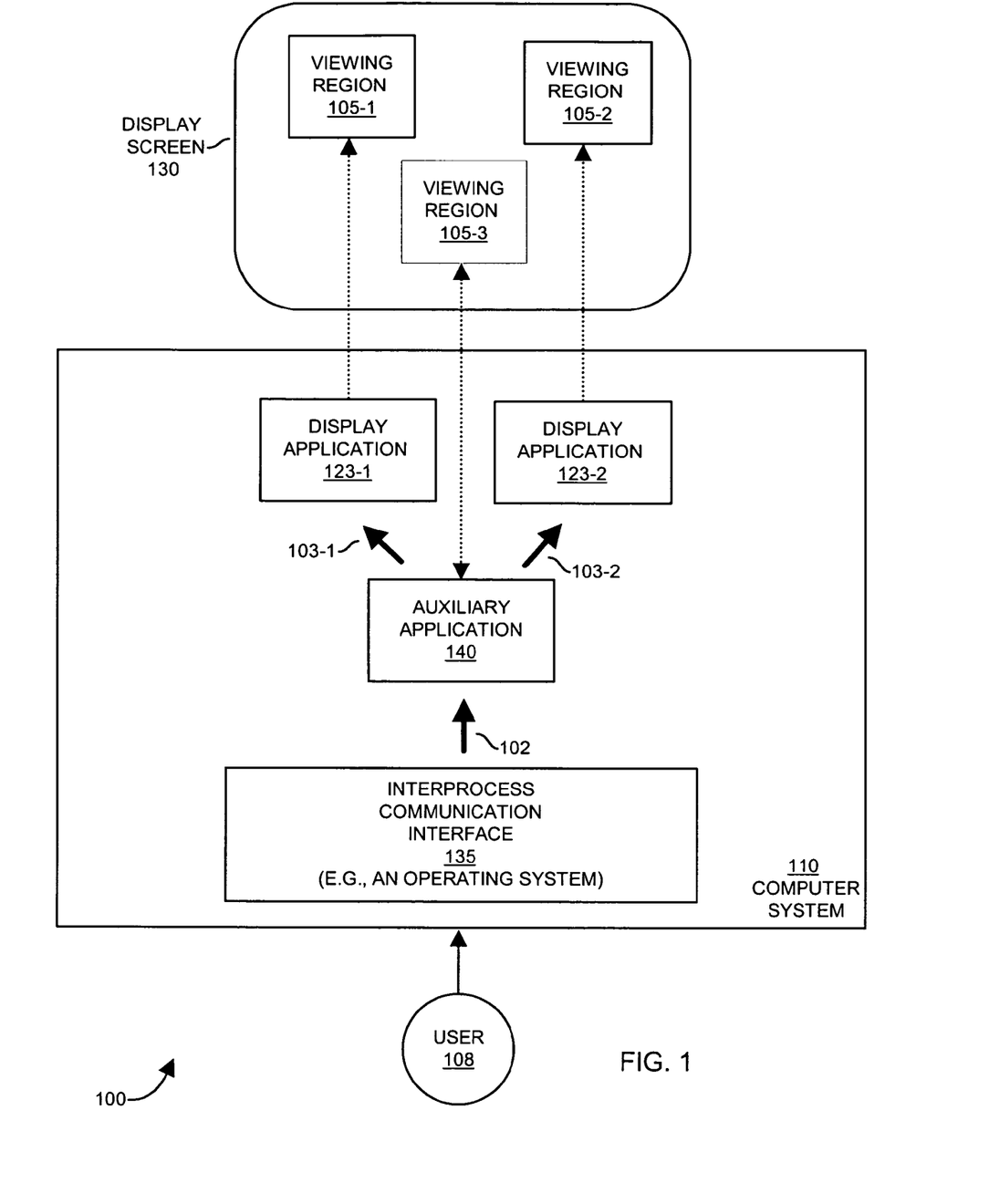
FIG. 1 is a diagram of a computer environment in which to execute an auxiliary application for duplicating and forwarding input commands to multiple display applications.

FIG. 1 is a block diagram illustrating computer environment 100. As shown, computer environment 100 includes computer system 110 and corresponding display screen 130 operated by user 108. Computer system 110 includes interprocess communication interface 135, auxiliary application 140, display application 123-1, and display application 123-2. Display screen 130 displays viewing region 105-1, viewing region 105-2, and viewing region 105-3 (collectively, viewing regions 105). In one embodiment, viewing regions 105 are windows on display screen 130 for displaying information to user 108.

In general, in the context shown, user 108 initiates execution of a first display application 123-1. The first display application 123-1 displays a first viewing region 105-1 (e.g., a first window including display content) on display screen 130. User 108 also initiates execution of a second display application 123-2. The second display application 123-2 displays a second viewing region 105-2 (e.g., a second window including display content) on the display screen 130.

Although not necessary, the second display application 123-1 can operate independently of the first display application 123-2. For example, each respective display application (e.g., an independently executing process utilizing interprocess communications to display content on a display screen) can independently retrieve the same file for uniquely displaying the same file in respective first viewing region 105-1 and the second viewing region 105-2. As an example, the first display application can be WORD™ and the second display application can be Framemaker™. Accordingly, user 108 can utilize viewing regions 105 to display and compare how a file appears in two or more different types of applications. Note, however, that techniques herein work equally well with dependent display applications (e.g., display applications associated with a common overall application) as well as types of applications not pertaining to displaying information to a user 108.

In addition to initiating execution of the first display application 123-1 and the second display application 123-2, user 108 also initiates execution of auxiliary application 140 that handles reception of input commands from the user 108 through the interprocess communication interface 135. For example, the auxiliary application 140 receives input command 102 from the user 108, duplicates and/or translates the input command 102, and forwards the duplicated input command 103 to both the first display application 123-1 and the second display application 123-2 to simultaneously modify an appearance of the first viewing region 105-1 and the second viewing region 105-2 on the display screen 130. Consequently, the auxiliary application 140 enables a user to simultaneously control (e.g., scroll through) contents of the first viewing region 105-1 and the second viewing region 105-2 via origination of a single control command (or a set of control commands) rather than requiring manual duplication of control commands by the user to both viewing regions. In other words, auxiliary application 140 serves to duplicate input commands (e.g., mouse input, keyboard input, etc.) from the user 108 for forwarding the input commands to multiple display applications. Consequently, a user 108 can initiate display of a common document in both the first viewing region 105-1 and the second viewing region 105-2 for simultaneous scrolling, viewing, and comparison of file contents appearing on display screen 130.

Note that scrolling is merely an example of a type of display command that can be duplicated and forwarded by the auxiliary application 140. In general, any type of command can be duplicated and forwarded by the auxiliary application 140. For example, an input command 102 or display command can initiate execution of i) a zooming function, ii) a document editing function, iii) a display function, and iv) a pull-down menu function, etc. associated with the first viewing region 105-1 and the second viewing region 105-2. Also, note that input to auxiliary application 140 can be data sequences that are, in turn, duplicated or translated and forwarded to multiple applications running on computer system 110.

According to one configuration, the user 108 initiates execution of the auxiliary application 140 after initiating execution of the first display application 123-1 and second display application 123-2. The auxiliary application 140 at least initially operates independently of the first display application 123-1 and the second display application 123-2. For example, in one embodiment, the auxiliary application 140 is not initially configured to duplicate and forward commands to any display applications on display screen 130. After initiating execution of the auxiliary application 140, the user 108 configures the auxiliary application 140 to forward commands to a selected set of display applications. For example, via input (e.g., clicking on a mouse, typing commands from a keyboard, selecting an entry from a pull-down menu, etc.) to viewing region 105-3, the user 108 can select to which display applications to forward future input commands 102 generated by the user 108. In the present example, the user 108 selects both the first display application 123-1 and the second display application 123-2 to forward input commands 102.

Functionality associated with auxiliary application 140 can be integrated into an operating system of computer system 110 to enhance a user's ability to initiate execution of auxiliary application 140 and simultaneously control multiple display applications.

According to a further configuration, user provides input such as a command through interprocess communication interface 135. Auxiliary application 140 duplicates input command 102 received through the interprocess communication interface 135 to produce forwarded input commands 103. The auxiliary application 140 then communicates or forwards the input through the interprocess communication interface 135 to the first display application and the second display application, which in turn utilize interprocess communication interface 135 to display respective viewing regions on display screen 130. The input commands forwarded from the auxiliary application 140 may or may not have the same form as the original input command 102. For example, according to one configuration, auxiliary application 140 duplicates the respective input command 103-1 and input command and produces forwarded input commands 103 that are identical or nearly identical to input command 102. Consequently, two different display applications that each define a same input to perform a same function can be synchronously controlled via a duplicated input command.

According to another configuration, the auxiliary application 140 forwards the input command through interprocess communication interface 135 to both the first display application and the second display application after translating the input command 102 depending on a respective application to which it is being forwarded prior to forwarding a translated input command to a respective display application. In other words, auxiliary application 140 can receive a command to perform a particular type of operation such as zooming. In response to receiving the command, auxiliary application 140 can reference a table to identify how to translate the command for a given display application prior to forwarding. Consequently, auxiliary application 140 can serve to forward commands to applications as well as translate or duplicate commands or portions thereof.

According to more advanced configurations herein, the auxiliary application 140 enables creation of a mapping function that defines how to translate a given input command prior to forwarding a respective command. In such an embodiment, a user 108 can define an input command and indicate to the auxiliary application 140 that when such an input is received, the auxiliary application must forward translated command to a target application instead of the originally received command. Thus, auxiliary application 140 can utilize the mapping function to control display functions associated with the first display application 123-1 and the second display application 123-2 based on translating received input commands prior to forwarding the received input commands to a respective display applications.

Note that in certain cases, the auxiliary application 140 can purposefully send different commands to separate display applications based on receipt of given command. For example, in response to detecting an occurrence of a specific input such as a keystroke, clicking of a mouse, etc., the auxiliary application 140 can send a first type of command to one application to perform a first function (e.g., scrolling) while sending a different type of command to another application to perform a second function (e.g., zooming). As mentioned, this further enables a user 108 the flexibility to control applications on computer system 110.

Figure 2:
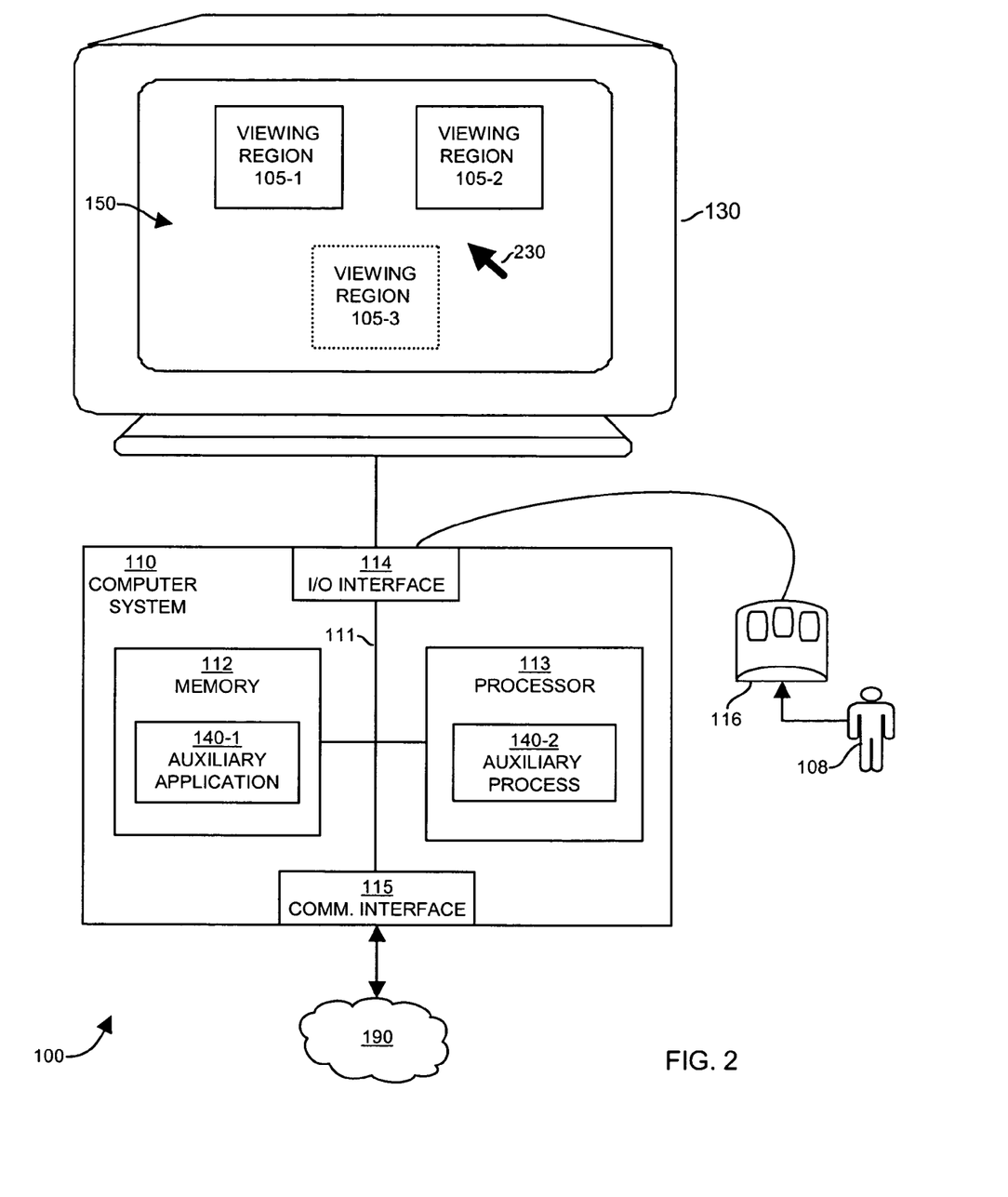
FIG. 2 is a diagram of a processing device suitable for executing an auxiliary application to duplicate and/or translate input commands.

FIG. 2 is a block diagram illustrating an example architecture of a computer system 110 that executes, runs, interprets, operates or otherwise performs an auxiliary application 140-1 and auxiliary process 140-2 suitable for use in explaining example configurations herein. As shown, graphical user interface 150 on display screen 130 includes viewing region 105-1, viewing region 105-2, viewing region 105-3 (optional), and pointer 230 controlled by an input device 116 such as a handheld mouse. Computer system 110 may be any type of computerized device such as a personal computer, workstation, portable computing device, console, laptop, network terminal or the like.

As shown in the present example, the computer system 110 includes an interconnection mechanism 111 such as a data bus or other circuitry that couples a memory system 112, a processor 113, an input/output interface 114, and a communications interface 115. Input device 116 (e.g., one or more user controlled devices such as a keyboard, mouse, etc.) couples to computer system 110 and, more specifically, processor 113 through I/O interface 114 and enables a user 108 to provide input commands to computer system 110 and generally control the graphical user interface 150 (e.g., viewing regions 105). The communications interface 115 enables the computer system 110 to communicate with other devices (i.e., other computers) over a network 190. Thus, computer system 110 can retrieve and display files stored in a local repository as well as, based on communications over network 190, can retrieve and display files retrieved form remote locations.

Memory system 112 can be any type of computer readable medium and in this example is encoded with auxiliary application 140-1 supporting generation, display (optional), and implementation of functional operations as explained herein. The auxiliary application 140-1 may be embodied as software code such as data and/or logic instructions (e.g., code stored in the memory or on another computer readable medium such as a removable disk) that supports processing functionality according to different embodiments described herein. During operation of the computer system 110, the processor 113 accesses the memory system 112 via the interconnect 111 in order to launch, run, execute, interpret or otherwise perform the logic instructions of the auxiliary application 140-1. Execution of auxiliary application 140-1 in this manner produces processing functionality in auxiliary process 140-2. In other words, auxiliary process 140-2 represents one or more portions or runtime instances of the auxiliary application 140-1 (or the entire application 140-1) performing or executing within or upon the processor 113 in the computer system 110 at runtime.

It should be noted that example configurations disclosed herein include the access auxiliary application 140-1 itself (i.e., in the form of un-executed or non-performing logic instructions and/or data) that is stored on a computer readable medium (such as a floppy disk), hard disk, electronic, magnetic, optical or other computer readable medium. The auxiliary application 140-1 may also be stored in a memory system 112 such as in firmware, read only memory (ROM), or, as in this example, as executable code in, for example, Random Access Memory (RAM). In addition to these embodiments, it should also be noted that other embodiments herein include the execution of the auxiliary application 140-1 in the processor 113 as the auxiliary process 140-2. Those skilled in the art will understand that the computer system 110 may include other processes and/or software and hardware components or systems not shown in this example.

It should be noted that the auxiliary application 140 executed in computer system 110 is represented in FIG. 2 by either one or both of the access auxiliary application 140-1 and/or the auxiliary process 140-2. For purposes of the discussion hereinafter, general reference will be made to the auxiliary application 140 as performing or supporting the various steps and functional operations to carry out techniques discussed herein.

Figure 3:
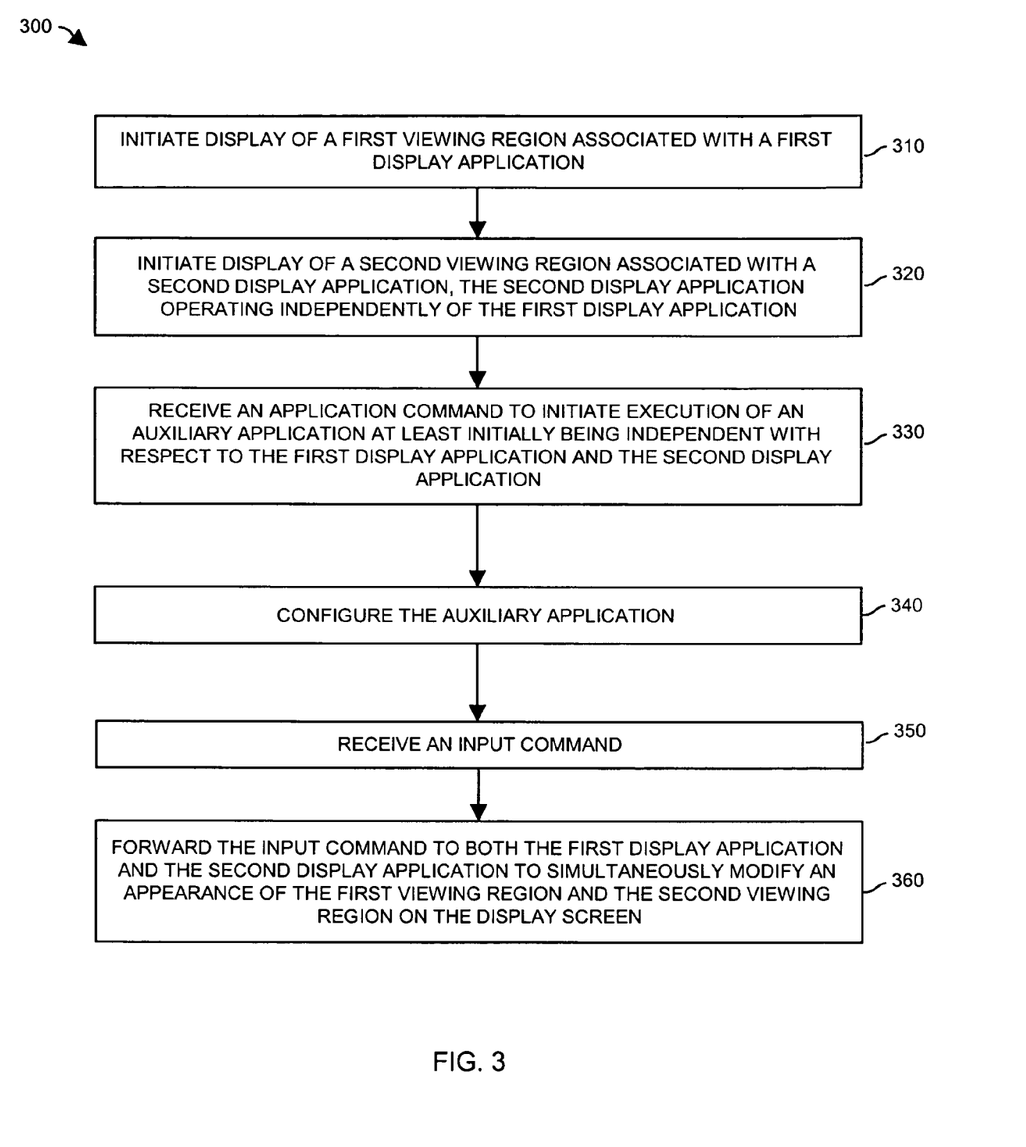
FIG. 3 is a flowchart illustrating a technique of duplicating input commands for forwarding to multiple display applications.

FIG. 3 is a flowchart 300 illustrating use of the auxiliary application 140 to control displaying of images in viewing regions 105 on a display screen 130 according to an embodiment herein. These techniques were previously discussed with respect to FIG. 1 and are now shown in flowchart form below.

In step 310, computer system 110 initiates display of a first viewing region 105-1 associated with a first display application 123-1.

In step 320, computer system 110 initiates display of a second viewing region associated with a second display application. As discussed, according to one configuration, the second display application 123-1 operates independently of the first display application 123-2. According to other configurations, display application 123-1 and display application 123-2 are parts of a larger associated display application. Prior to opening auxiliary application 140 in the following step, the first display application and the second display application at least initially receives display commands directly from an operating system on a computer to control a display of the first viewing region and the second viewing region.

In step 330, computer system 110 receives an application command to initiate execution of auxiliary application 140. According to one configuration, at least initially, auxiliary application 140 is independent with respect to the first display application 123-1 and the second display application 123-2. That is, auxiliary application 140 is initially not configured to forward input to any display applications associated with display screen 130.

In step 340, computer system 110 configures the auxiliary application 140. For example, a user 108 selects to which open windows on display screen 130 to forward duplicated input commands.

In step 350, computer system 110 receives an input command from user 108 or other entity.

In step 360, computer system 110 forwards the input command to both the first display application 123-1 and the second display application 123-2 to simultaneously modify an appearance of the first viewing region 105-1 and the second viewing region 105-2 on the display screen 130. Accordingly, after execution of the auxiliary application 140, the auxiliary application 140 then receives display commands directly from the user via the interprocess communication interface 135 (e.g., operating system) and forwards the input commands to the first display application 123-1 and the second display application 123-2 to modify images in respective viewing region 105-1 and viewing region 105-2.

Figure 4:
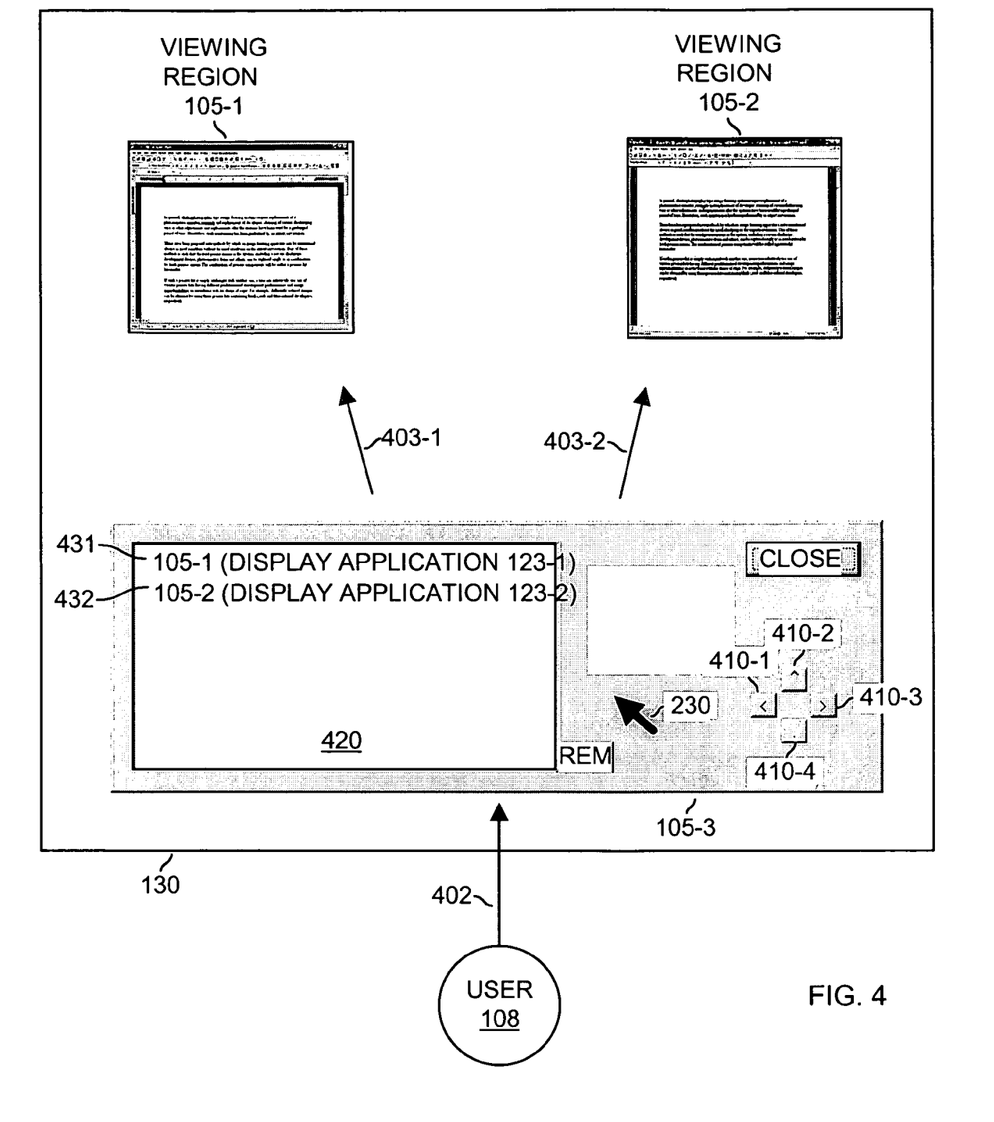
FIG. 4 is a pictorial diagram of a graphical user interface for simultaneously controlling and viewing multiple display applications.

FIG. 4 is a pictorial diagram of a populated display screen 130 according to an embodiment herein. As shown, display screen 130 includes viewing region 105-1 (e.g., a document viewed in WORD™), viewing region 105-2 (e.g., a document viewed in Word Perfect™), and viewing region 105-3 (e.g., a control center for receiving input commands 402 and notifying user 108 of activation of the auxiliary application 140). One purpose of displaying the first viewing region 105-1 and initiating display of the second viewing region 105-2 is to enable simultaneous viewing and comparison of a common document displayed in two or more different display applications. Sample source code to carry out functionality according to one embodiment can be found in attached Appendix A.

One method of selecting which of multiple display applications to forward input commands 402 is to select (e.g., click on via arrow 230) viewing regions 105 on display screen 130 to which the auxiliary application 140 will forward future commands. For example, after initiating execution of auxiliary application 140, the user 108 clicks on viewing region 105-3 and drags a bar (e.g., bar is created in response to clicking viewing region 105-3) that is dropped on a selected viewing region 105 such as viewing region 105-1. This action enables auxiliary application 140 to receive an identifier of the viewing region that the user selects. Thus, from the perspective of the auxiliary application 140, configuring the auxiliary application 140 based on input commands from user 108 includes i) receiving a first identifier 431 associated with the first viewing region 105-1 based on a first viewing region selection (e.g., dragging and dropping a bar form viewing region 105-3 to viewing region 105-1) by the user 108 and ii) receiving a second identifier 432 associated with the second viewing region 105-2 based on a second viewing region selection (e.g., dragging and dropping a bar from viewing region 105-3 to viewing region 105-2) by the user 108. After such actions, auxiliary application 140 is now configured to forward commands as discussed herein. Display region 420 of viewing region 105-3 includes a listing of the first identifier 431 and second identifier 432. According to one configuration, the auxiliary application 140 can utilize bookmarks as well.

Viewing region 105-3 associated with auxiliary application 140 includes directional scroll icon 410-1, directional scroll icon 410-2, directional scroll icon 410-3, and directional scroll icon 410-4. Such selectable display elements can be selected by clicked by arrow 230 for purposes of navigating a document displayed in viewing region 105-1 and viewing region 105-2. Accordingly, receiving input from user 108 can include detecting selection of a directional scroll icon 410 in a viewing region 105-3 of the display screen 130.

In addition to clicking on directional scroll icons 410, a user 108 can position arrow 230 over a respective viewing region 105 to perform a function. For example, user 108 can position arrow 230 over viewing region 105-3 and manually roll a middle control button of a mouse to simultaneously scroll up and down both documents displayed in respective viewing region 105-1 and viewing region 105-2. While still in the mode as shown, user 108 can position arrow 230 over viewing region 105-1 and manually roll a middle control button of a mouse to scroll up and down only the document appearing in the first viewing region 105-1. While still in the mode as shown, user 108 can position arrow 230 over viewing region 105-2 and manually roll a middle control button of a mouse to scroll up and down the document appearing in the first viewing region 105-2. Thus, a position of arrow 230 on display screen 130 can indicate whether to duplicate and forward commands to multiple selected applications or send a command to only a single application of computer system 110.

Note that the auxiliary application 140 need not have an associated viewing region 105-3 (e.g., a third viewing region) on the display screen 130 in which to receive input commands. For example, according to one configuration, a user 108 can configure computer system 110 and, more specifically, auxiliary application 140 to duplicate and forward input to multiple applications without use of viewing region 105-3. In other words, a user 108 can select a mode in which the auxiliary application 140 receives input commands from a user 108 and sends the input commands to any or all open viewing regions 105 (e.g., windows) on a display screen 130 for simultaneously modifying an appearance of respective images in the open windows on the display screen 130.

Note according to yet other configurations, a viewing region need not be open on the display screen 130 in order to receive an input command from the auxiliary application 140. For example, the auxiliary application 140 can also send a duplicated input command to display applications having respective minimized windows displayed on the display screen 130.

In addition to implementing auxiliary application 140 as discussed above, computer system 110 and, more specifically, auxiliary application 140 can be configured based on activation of a "hot key" function accompanied by selection of the first viewing region 105-1 and the second viewing region 105-2 of the display screen 130. The selection identifies that the first display application 105-1 and the second display application 105-2 are destinations in which to forward commands received by the auxiliary application 140 in lieu of sending the commands to only a single display application associated with an open foreground window in the display screen 130.

Figure 5:
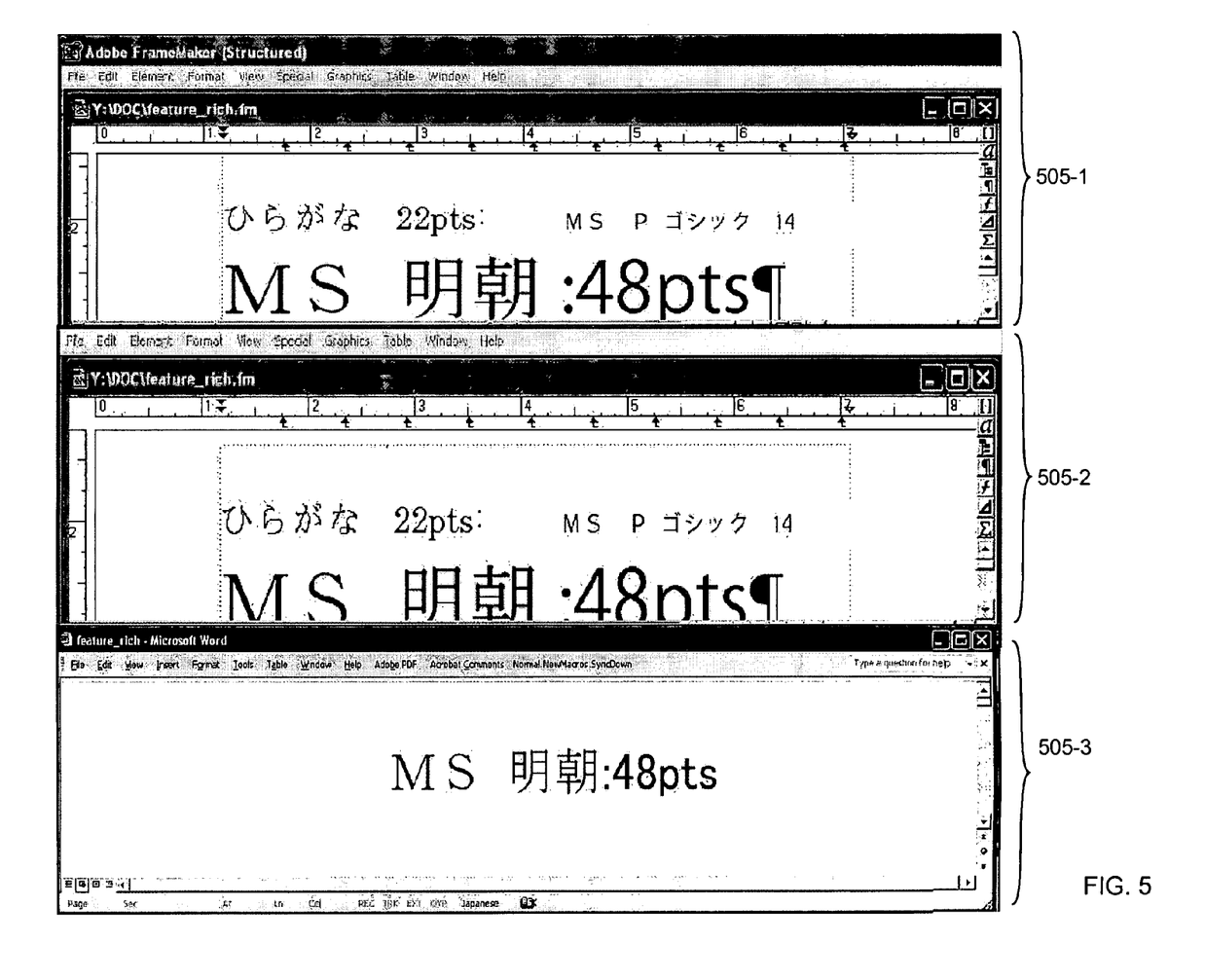
FIG. 5 is a pictorial diagram of a graphical user interface including two display applications for viewing the same file.

FIG. 5 is a pictorial diagram of a populated display screen 130 according to an embodiment herein. As shown in this example, the same document has been imported into Framemaker™ 7.0 and 7.1 as well as WORD™. The embodiments as discussed herein enable forwarding of input to respective display applications associated with viewing region 505-1 (e.g., display of a document in Framemaker 7.1™), viewing region 505-2 (e.g., display of the document in Framemaker 7.0™), and viewing region 505-3 (e.g., display of the document in WORD™). Based on simultaneously manipulating an appearance of the document (e.g., viewing region) in these display applications as discussed herein, the user 108 can reduce a time associated with reviewing the document in the different display applications. Note, however, that the techniques of duplicating and forwarding input can be useful in other types of applications as well.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

What is claimed is:

1. A computer-implemented method in which at least one processor executes instructions retrieved from computer storage for displaying information on a display screen, the computer-implemented method comprising:

on the display screen, initiating display of a first viewing region associated with a first display application;

on the display screen, initiating display of a second viewing region associated with a second display application, the second display application operating independently of the first display application;

creating a mapping function, the mapping function indicating how to translate commands prior to being forwarded to the first display application and the second display application;

receiving an input command;

based on the mapping function, translating the received input command into multiple different commands, the multiple different commands including a first command and a second command, the first command being different than the second command;

forwarding the first command of the multiple different commands to the first display application and forwarding the second command of the multiple different commands to the second display application to simultaneously modify an appearance of the first viewing region and the second viewing region; and selectively forwarding input commands to the first display application and the second display application depending on a position of a pointer over one of the first region or the second region when receiving the input commands.

2. A computer-implemented method as in claim 1 further comprising:

prior to receiving the input command to forward to both the first display application and the second display application:

receiving an application command to initiate execution of a third application at least initially being independent with respect to the first display application and the second display application; and configuring the third application to receive the input command and forward the input command to both the first display application and the second display application.

3. A computer-implemented method as in claim 2, wherein configuring the third application includes:

based on a first viewing region selection, receiving a first identifier associated with the first viewing region;

based on a second viewing region selection, receiving a second identifier associated with the second viewing region; and via a third viewing region on the display screen associated with the third application, enabling simultaneous control with respect to images presented in the first viewing region and the second viewing region based on further display commands input to the third viewing region, the third application not being associated with any viewing region on the display screen until after receiving the first viewing region selection and the second viewing region selection;

the first viewing region being a first background window on the display screen, the second viewing region being a second background window on the display screen, the third viewing region being an active window on the display screen.

4. A computer-implemented method as in claim 2, wherein receiving the application command to initiate execution of the third application includes receiving an activation of a hot key function accompanied by selection of the first viewing region and the second viewing region of the display screen to identify that the first display application and the second display application are destinations in which to forward future display commands received by the third application in lieu of sending the future display commands to only a single display application associated with an open foreground window in the display screen.

5. A computer-implemented method as in claim 1 further comprising:

utilizing the mapping function to simultaneously control display functions associated with the first display application and the second display application based on translating each of multiple received input commands prior to forwarding the received input commands to a respective display application.

6. A computer-implemented method as in claim 1, wherein at least one of the first viewing region or the second viewing region is a minimized window on the display screen.

7. A computer-implemented method as in claim 1, wherein initiating display of the first viewing region and initiating display of the second viewing region results in a display of a common document in both the first viewing region and the second viewing region for simultaneous viewing and comparison, the computer-implemented method further comprising:

utilizing inter process communications to facilitate a display of the first viewing region and the second viewing region on the display screen.

8. A computer-implemented method in which at least one processor executes instructions retrieved from computer storage for displaying information on a display screen, the computer-implemented method comprising:

on the display screen, initiating display of a first viewing region associated with a first display application;

on the display screen, initiating display of a second viewing region associated with a second display application, the second display application operating independently of the first display application;

forwarding a first input command to both the first display application and the second display application to modify an appearance of the first viewing region and the second viewing region on the display screen;

prior to receiving the first input command to forward to both the first display application and the second display application: receiving an application command to initiate execution of a third application at least initially being independent with respect to the first display application and the second display application;

configuring the third application to receive the first input command and forward the first input command to both the first display application and the second display application;

displaying a third viewing region on the display screen, the third viewing region being associated with the third application;

displaying a movable pointer on the display screen;

in response to detecting a condition of receiving a second input command while the pointer is over the third viewing region, forwarding the second input command to both the first display application and the second display application to simultaneously modify an appearance of the first viewing region and the second viewing region on the display screen;

in response to detecting a condition of receiving the second input command while the pointer is over the first viewing region, forwarding the second input command to the first display application and not the second display application to modify an appearance of the first viewing region and not the second viewing region on the display screen; and in response to detecting a condition of receiving the second input command while the pointer is over the second viewing region, forwarding the second input command to the second display application and not the first display application to modify an appearance of the second viewing region and not the first viewing region on the display screen.

9. A computer-implemented method as in claim 2, wherein displaying the third viewing region includes:

displaying a set of selectable, directional scroll display elements in the third viewing region for receiving the input command; and wherein receiving the input command includes detecting selection of a particular scroll element from the displayed set.

10. A computer-readable storage medium having instructions stored thereon for processing data information, such that the instructions, when carried out by a processing device, enable the processing device to perform the operations of:

on a display screen, initiating display of a first viewing region associated with a first display application;

on the display screen, initiating display of a second viewing region associated with a second display application, the second display application operating independently of the first display application;

creating a mapping function, the mapping function indicating how to translate commands prior to being forwarded to the first display application and the second display application;

receiving an input command;

based on the mapping function, translating the received input command into multiple different commands, the multiple different commands including a first command and a second command, the first command being different than the second command;

forwarding the first command of the multiple different commands to the first display application and forwarding the second command of the multiple different commands to the second display application to simultaneously modify an appearance of the first viewing region and the second viewing region; and selectively forwarding input commands to the first display application and the second display application depending on a position of a pointer over one of the first region or the second region when receiving the input commands.

11. A computer readable storage medium as in claim 10 further supporting operations of:

prior to receiving the input command:

receiving an application command to initiate execution of a third application at least initially being independent with respect to the first display application and the second display application;

configuring the third application to receive the input command and forward the input command to both the first display application and the second display application; and wherein forwarding the input command to both the first display application and the second display application includes a step of translating the input command depending on a respective application to which it is being forwarded prior to forwarding a translated input command to a respective application.

12. A computer readable storage medium as in claim 11, wherein configuring the third application includes:

based on a first viewing region selection, receiving a first identifier associated with the first viewing region;

based on a second viewing region selection, receiving a second identifier associated with the second viewing region; and via a third viewing region on the display screen associated with the third application, enabling simultaneous control images presented in the first viewing region and the second viewing region based on further display commands input to the third viewing region, the third application not being associated with any viewing region on the display screen until after receiving the first viewing region selection and the second viewing region selection.

13. A computer readable storage medium as in claim 11, wherein receiving the application command to initiate execution of the third application includes receiving an activation of a hot key function accompanied selection of the first viewing region and the second viewing region of the display screen to identify that the first display application and the second display application are destinations in which to forward future display commands received by the third application in lieu of sending the future display commands to only a single display application associated with an open foreground window in the display screen.

14. A computer readable storage medium as in claim 10 further supporting operations of:

utilizing the mapping function to simultaneously control display functions associated with the first display application and the second display application based on translating received input commands prior to forwarding the received input commands to a respective display application.

15. A computer-readable storage medium having instructions stored thereon for processing data information, such that the instructions, when carried out by a processing device, enable the processing device to perform the operations of:
on a display screen, initiating display of a first viewing region associated with a first display application;
on the display screen, initiating display of a second viewing region associated with a second display application, the second display application operating independently of the first display application;
forwarding an input command to both the first display application and the second display application to modify an appearance of the first viewing region and the second viewing region on the display screen;
prior to receiving the input command:
receiving an application command to initiate execution of a third application at least initially being independent with respect to the first display application and the second display application; and
configuring the third application to receive the input command and forward the input command to both the first display application and the second display application;
displaying a third viewing region on the display screen, the third viewing region being associated with the third application, wherein receiving the input command includes detecting that a pointer associated with the display screen resides over one of the first viewing region, the second viewing region, or the third viewing region;
in response to receiving the input command while the pointer is over the third viewing region, forwarding the input command to both the first display application and the second display application to simultaneously modify an appearance of the first viewing region and the second viewing region on the display screen;
in response to receiving the input command while the pointer is over the first viewing region, forwarding the input command to the first display application and not the second display application to modify an appearance of the first viewing region and not the second viewing region on the display screen; and
in response to receiving the input command while the pointer is over the second viewing region, forwarding the input command to the second display application and not the first display application to modify an appearance of the second viewing region and not the first viewing region on the display screen.

16. A computer readable storage medium as in claim 10, wherein initiating display of the first viewing region and initiating display of the second viewing region results in a display of a common document in both the first viewing region and the second viewing region for simultaneous viewing and comparison.

17. A computer system for displaying information on a display screen, the computer system comprising:
a processor;
a memory unit that stores instructions associated with an application executed by the processor; and
an interconnect coupling the processor and the memory unit, enabling the computer system to execute the application and perform operations of:
on the display screen, initiating display of a first viewing region associated with a first display application;
on the display screen, initiating display of a second viewing region associated with a second display application, the second display application operating independently of the first display application;
enabling creation of a mapping function that defines how to translate a given input command into multiple different commands for forwarding to the first display application and the second display application;
forwarding a first command of the multiple different commands to the first display application to modify the first viewing region;
forwarding a second command of the multiple different commands to the second display application to modify the second viewing region;
in addition to displaying the first viewing region associated with the first display application and displaying the second viewing region associated with the second display application, initiating display of a third viewing region on the display screen, the third viewing region generated by an auxiliary application that receives the input command, the third viewing region displayed on the display screen for forwarding of input commands to both the first display application and the second display application;
displaying a pointer on the display screen; and
wherein forwarding the first command of the multiple different commands to the first display application and forwarding the second command of the multiple different commands to the second display application occur in response to detecting that the input command was received when the pointer was positioned over the third viewing region.

18. A computer system as in claim 17 further supporting operations of:
prior to receiving the input command:
receiving an application command to initiate execution of a third application at least initially being independent with respect to the first display application and the second display application; and
configuring the third application to receive the input command and forward the input command to both the first display application and the second display application.

19. A computer system as in claim 18, wherein the first display application and the second display application at least initially receives display commands directly from an operating system on a computer to control a display of the first viewing region and the second viewing region until execution of the third application, after which the third application then receives display commands directly from the operating system and forwards the display commands to the first display application and the second display application.

20. A computer system as in claim 17, wherein the third application is integrated into an operating system of the computer, the operating system facilitating the execution of the first display application and the second display application.

21. A computer system as in claim 17, wherein the input command initiates activation of at least one of a scrolling function and a zooming function, associated with the first viewing region and a different one of a scrolling function and a zooming function associated with the second viewing region.

22. The computer-implemented method of claim 1 further comprising invoking the mapping function by an auxiliary application for duplicating the input commands and forwarding at least one duplicated input command to the first display application and the second display application.

23. The computer-implemented method of claim 22 wherein mapping further comprises referencing, by the auxiliary application, a translation table for each of the duplicated commands to identify a translation corresponding to each of the first display application and the second display application.

24. The computer-implemented method as in claim 1, further comprising:
in addition to displaying the first viewing region associated with the first display application and displaying the second viewing region associated with the second display application, initiating display of a third viewing region on the display screen, the third viewing region generated by an auxiliary application that receives the input command, the third viewing region displayed on the display screen for forwarding of input commands to both the first display application and the second display application.

25. A computer-implemented method in which at least one processor executes instructions retrieved from computer storage for displaying information on a display screen, the computer-implemented method comprising:
on the display screen, initiating display of a first viewing region associated with a first display application;
on the display screen, initiating display of a second viewing region associated with a second display application, the second display application operating independently of the first display application;
creating a mapping function, the mapping function indicating how to translate commands prior to being forwarded to the first display application and the second display application;
receiving an input command;
based on the mapping function, translating the received input command into multiple different commands, the multiple different commands including a first command and a second command, the first command being different than the second command;
forwarding the first command of the multiple different commands to the first display application and forwarding the second command of the multiple different commands to the second display application to simultaneously modify an appearance of the first viewing region and the second viewing region;
in addition to displaying the first viewing region associated with the first display application and displaying the second viewing region associated with the second display application, initiating display of a third viewing region on the display screen, the third viewing region generated by an auxiliary application that receives the input command, the third viewing region displayed on the display screen for forwarding of input commands to both the first display application and the second display application;
displaying a pointer on the display screen; and
wherein forwarding the first command of the multiple different commands to the first display application and forwarding the second command of the multiple different commands to the second display application occur in response to detecting that the input command was received when the pointer was positioned over the third viewing region.

26. The computer-implemented method as in claim 1, wherein translating the received input command includes:
translating the received input command into the first command of the multiple different commands, the first command supporting performance of a first type of display function with respect to the first viewing region; and
translating the received input command into the second command or multiple different commands, the second command supporting performance of a second type of display function with respect to the second viewing region, the first type of display function being different than the second type of display function.

27. The computer-implemented method as in claim 1, wherein both the first command and the second command support a same type of display function with respect to the first display application and the second display application.

28. The computer-implemented method as in claim 1 further comprising:
in addition to displaying the first viewing region associated with the first display application, initiating display of a third viewing region on the display screen, the third viewing region generated by an auxiliary application that receives the input command translated and forwarded to the first display application and the second display application; and
displaying the third viewing region as a topmost window amongst multiple background windows displayed on the display screen, the background windows including a first background window and a second background window, the first background window displayed in the first viewing region, the second background window displayed in the second viewing region.

29. The computer-implemented method as in claim 28, wherein the auxiliary application monitors a position of a pointer on the display screen in order to determine which set of one or more display applications to forward the received input command.

30. The computer-implemented method as in claim 28 further comprising:
providing a visual indication in the third viewing region to indicate that the auxiliary application has been configured to receive and translate the input command and forward the first command to the first display application and forward the second command to the second display application.

* * * * *